United States Patent [19]

Fritsche

[11] 4,002,582

[45] Jan. 11, 1977

[54] METHOD FOR THE PRODUCTION OF COATINGS

[75] Inventor: Peter Fritsche, Hiltrup, Germany

[73] Assignee: BASF Farben & Fasern AG, Ludwigshafen, Germany

[22] Filed: Aug. 22, 1974

[21] Appl. No.: 499,609

Related U.S. Application Data

[60] Division of Ser. No. 389,794, Aug. 20, 1973, which is a continuation of Ser. No. 149,792, June 3, 1971, abandoned.

[30] Foreign Application Priority Data

June 4, 1970  Germany ............... 2027428

[52] U.S. Cl. .............. 260/4 R; 204/181; 260/3.5; 260/19 UA; 260/29.3; 260/844; 427/296; 427/385 R
[51] Int. Cl.$^2$ .............. C08L 91/00; C08L 61/10
[58] Field of Search ............ 260/3.5, 4 R, 19 UA, 260/734, 29.3

[56] References Cited

UNITED STATES PATENTS

| | | | |
|---|---|---|---|
| 2,661,340 | 12/1953 | Van Veersen | 260/734 |
| 3,162,611 | 12/1964 | Varron et al. | 260/4 R |
| 3,351,575 | 11/1967 | Gilchrist | 260/19 UA |
| 3,403,048 | 9/1968 | Grimm et al. | 260/734 |
| 3,632,393 | 1/1972 | Poppe et al. | 260/4 R |
| 3,679,615 | 7/1972 | Gilchrist | 260/19 UA |
| 3,697,461 | 10/1972 | Troeger et al. | 260/19 UA |
| 3,761,432 | 9/1973 | Fritsche | 260/4 R |

*Primary Examiner*—John C. Bleutge
*Attorney, Agent, or Firm*—Gilbert L. Wells

[57] ABSTRACT

Improved film-forming organic resin paint aqueous binder replenishment concentrated compositions adapted for dispersing in an aqueous electrocoating bath containing sufficient additional water-soluble amino compound to impart anionic polyelectrolyte behavior in the bath to the resin in the binder concentrate compositions, the binder concentrate compositions comprising:

40–70 percent: by weight of cyclized rubber in 60–30 percent by weight of a binder mixture wherein the binder mixture comprises:

I. about 10–50 percent by weight of a non-heat reactive phenol-aldehyde resin; and
II. about 50–90 percent by weight of a copolymer, said copolymer comprising:
   A. about 50–85 percent by weight of an ester of methacrylic acid or acrylic acid with an alcohol having 1–10 carbon atoms;
   B. about 5–20 percent by weight of drying oils or drying oil fatty acids containing olefinically unsaturated fatty acids;
   C. about 5–15 percent by weight of an $\alpha,\beta$-olefinically unsaturated carboxylic acid having 3–5 carbon atoms;
   D. about 3–20 percent by weight of methacrylamide, acrylamide, methylol methacrylamide, methylol acrylamide, an ether of methylol methacrylamide with an alcohol having 1–8 carbon atoms, an ether of methylol acrylamide having 1–8 carbon atoms or a mixture thereof, and optionally
   E. up to 20 percent by weight of further copolymerizable olefinically unsaturated compounds.

4 Claims, No Drawings

4,002,582

METHOD FOR THE PRODUCTION OF COATINGS

CROSS-REFERENCE TO RELATED APPLICATIONS

This is a division of application Ser. No. 389,794, filed Aug. 20, 1973, which in turn is a continuation of application Ser. No. 149,792, filed June 3, 1971, now abandoned.

Applicant claims priority under 35 U.S.C. 119 for Application No. P 20 27 428.6, filed June 4, 1970 in the Patent Office of the Federal Republic of Germany. Applicant incorporates by reference the disclosure of his copending application entitled "Method for the Production of Aluminum Coatings", Ser. No. 149,751, filed in the U.S. Patent Office on the third of June 1971, now U.S. Pat. No. 3,761,432.

BACKGROUND OF THE INVENTION

The field of the invention is synthetic resins with fat, fatty oil, fatty oil acid or salt thereof. The present invention is particularly concerned with electrophoretically deposited coatings which dry at room temperature. These coatings can also be cured in an accelerated manner at temperatures of up to 85° C in order to shorten the drying time.

The state of the prior art of electrophoretic deposition of coatings from aqueous suspension may be ascertained by reference to the Kirk-Othmer "Encyclopedia of Chemical Technology", 1st Ed., Vol. 5 (1950), under the section "Electrophoretic Deposition", pages 606–610 and Vol. 8, 2nd Ed. (1965), under the section "Electrophoretic Deposition", pages 23–26. The preparation, designation and use of the cyclized rubber used in the present invention is disclosed in Kirk-Othmer, 2nd Ed., Vol. 17 (1968), pages 651–655, U.S. Pat. No. 2,691,340 of Van Veersen and British Pat. No. 634,879 of Gordon.

Processes for the electrophoretic formation of coatings on metallic workpieces by dipping the object, connected as the anode, into an electric dip coating bath are conventional. In order to cure these coatings, they had to be baked heretofore, without exception, at temperatures of more than 120° C over a longer period of time. By the use of the convention electrocoating processes, only baked enamel coatings could be produced heretofore. Thus, Swiss Patent No. 419,770 describes a process for the electrophoretic production of a synthetic resin coating wherein baking enamels are employed containing, as the binders, acrylate resins, alkyd resins, or maleate oils by themselves or in combination with urea resins or melamine resins, These coatings are baked for at least one-half hour at at least 120° or 130° C.

U.S. Pat. No. 3,230,162 of Gilchrist, dated Jan. 18, 1966, likewise discloses an anodic electrocoating process wherein baked enamel coatings are produced with the use of neutralized polycarboxylic acid resins.

In British Patents Nos. 1,161,819 and 1,168,269, the electrophoretic deposition of acrylate polymers from their neutralized aqueous solutions is set forth. In this case, however, it is necessary to bake the coatings for at least 20 minutes at at least 170° C in order to obtain cured films.

At temperatures of below 100° C, the prior art deposited coatings remain tacky and do not harden. However, this means that coatings are obtained without any useful technological and corrosion-protective properties. For the curing of baked enamel coatings, high temperatures and thus also high amounts of energy are required. The use of baked enamel coatings is essentially limited to the coating of metals. For the electrocoating of heat-sensitive materials, such as wooden materials, rubber articles, or synthetic resin and plastic articles, it is generally impossible to employ baked enamel coatings. In this case, air-drying coatings must be used. In the extreme case, it is possible to operate at slightly increased temperatures, up to a maximum of 85° C. Otherwise, the articles to be coated are damaged. The accelerated drying of air-drying coatings at an elevated temperature up to 85° C is sometimes necessary in order to obtain certain mechanical and corrosion-protective results. In order to increase the spectrum of applications of electrocoating, it has been desirable to discover air-drying electrocoatings.

SUMMARY OF THE INVENTION

According to the present invention, coatings drying at room temperature on metals or electrically conductive articles, especially with metallic surfaces, connected as the anode and dipped into a liquid are deposited by electrocoating from aqueous coating compositions. The coatings are subsequently cured after removal from the coating composition. The aqueous coating compositions are a dispersion of:

40–70 percent by weight of cyclized rubber in 60–30 percent by weight of a binder mixture dissolved or dispersed in water at least partially in the form of salts of inorganic alkalies or ammonia and/or volatile organic water-soluble amines, which binder mixture comprises:

I. 10–50 percent by weight of a non-heat reactive phenolaldehyde resin; and
II. 50–90 percent by weight of a copolymer comprising:
  A. about 50–85 percent by weight of at least one ester of acrylic acid or methacrylic acid with alcohols having 1–10 carbon atoms;
  B. about 5–20 percent by weight of drying oils or drying oil fatty acids containing olefinically unsaturated fatty acids;
  C. about 5–15 percent by weight of at least one copolymerizable $\alpha,\beta$-olefinically unsaturated carboxylic acid having 3–5 carbon atoms;
  D. about 3–20 percent by weight of acrylamide, methacrylamide, methylol acrylamide, methylol methacrylamide, an ether of methylol acrylamide with alcohols having 1–8 carbon atoms, an ether of methylol methacrylamide with alcohols having 1–8 carbon atoms, or a mixture thereof; and optionally
  E. 0.1 to 20 percent by weight of further copolymerizable, olefinically unsaturated compounds.

The coating composition is produced by dispersing a solution of cyclized rubber in organic solvents in a binder mixture dissolved or dispersed in water at least partially in the form of the salts of inorganic alkalies or ammonia and/or volatile organic water-soluble amines, which binder mixture consists of:

I. 10–50 percent by weight of at least one conventional phenol-aldehyde resin, and
II. 50–90 percent by weight of a copolymer of:
  A. 50–85 percent by weight of at least one ester of acrylic acid or methacrylic acid with alcohols having 1–10 carbon atoms;

B. 5–20 percent by weight of at least one drying oil or drying oil fatty acid containing olefinically unsaturated fatty acids;

C. 5–15 percent by weight of at least one copolymerizable α,β-olefinically unsaturated carboxylic acid having 3–5 carbon atoms;

D. 3–20 percent by weight of acrylamide, methacrylamide, methylol acrylamide, methylol methacryliade, an ether of methylol acrylamide with alcohols having 1–8 carbon atoms, an ether of methylol methacrylamide with alcohols having 1–8 carbon atoms or mixtures thereof; and optionally E. 0.1 to 20 percent by weight of further copolymerizable, olefinically unsaturated compounds.

The coatings obtained in accordance with the present invention can be cured in air at room temperature. Moreover, they can also be cured in an accelerated curing process at up to 85° C. The coating compositions of this invention furthermore excel, in particular, by a good throwing power and by bath stability. The dispersion obtained exhibits shelf stability over a period of several months. The mixture of phenolic resin I and copolymer II serving as the dispersing medium effects, in its neutralized form, a particularly excellent stabilization of the dispersion even at low solids contents of below 10 percent of solid substance, as they are employed especially for purposes of electrocoating.

The mixture of phenolic resin I and copolymer II simultaneously has the effect of a plasticizing component for the cyclized rubber. Surprisingly, the coatings obtained with the dispersion of the present invention exhibit a good flow behavior and a very advantageous hardness/impact strength ratio. In the short term weathering test according to German Industrial Standard DIN 50018, the coatings were still without any noticeable loss in luster with respect to the order. Even after a test in a constant steam atmosphere at 40° C and 95 percent relative atmospheric humidity for a duration of 1000 hours, metallic sheets coated with the coatings of this invention were still unaffected. In the salt spray test according to ASTM B 117-57 T, coated sheets showed signs of attack only after 168 hours.

In addition to metal bases such as steel, copper and aluminum, plastic parts coated with aluminum by the high vacuum deposition method were coated in accordance with the process of this invention and exposed to outdoor conditions during the winter season over a period of 6 months while attached to trucks. After the test, the parts coated in accordance with this invention exhibited a better result than those metalized plastic parts which had been coated with a varnish layer in a conventional spray procedure.

DESCRIPTION OF THE PREFERRED EMBODIMENTS

Suitable as component I are the customary phenolic resins, i.e., the condensation products of phenols and formaldehyde ordinarily produced from phenols and substituted phenols, such as, e.g., phenol, cresol, xylenol, 2,2-bis(p-hydroxyphenyl) propane and aqueous formaldehyde solution in the presence of conventional basic catalytic agents, such as, for example, ammonia or water-soluble amines (see, for instance, K. Hultzsch "Chemie der Phenolharze" [Chemistry of Phenolic Resins], Springer publishers, 1950, p. 118). The phenolic resin is contained in the binder mixture serving as the dispersing agent in an amount of 10–50 percent by weight, preferably 20–35 percent by weight.

The copolymer II of the binder mixture contains, as component (A), 50–85, preferably 50–70 percent by weight of at least one ester of acrylic acid or methacrylic acid with alcohols containing 1–10 carbon atoms, polymerized into this copolymer. Suitable esters of acrylic acid or methacrylic acid are those with straight chain, branched, or cyclic alcohols, such as, for example, methanol, ethanol, propanol, n-butanol, isobutanol, tert.-butanol, amyl alcohol, hexyl alcohol, cyclohexanol, heptanol, octanol, 2-ethylhexanol, nonanol, and decanol, as well as mixtures of these esters. Particularly suitable are the esters of acrylic acid with n-butanol, isobutanol, as well as methyl methacrylate, or mixtures of these esters.

As component (B), the copolymer II contains, according to this invention, 5–20, preferably 7–15 percent by weight of at least one drying oil containing olefinically unsaturated fatty acids, polymerized therein. Preferably suitable are oils containing at least partially conjugated double bonds. Suitable as such oils are soybean oil, linseed oil and preferably isomerized linseed oil; tall oil, and tall oil distillates, such as, for example, the so-called intermediate fraction, which distillates consist of a fatty acid/rosin acid mixture with about 25–30 percent by weight of rosin acid; dehydrated castor oil, as well as castor oil. The content in these unsaturated oils of conjugated double bonds can be determined, for example, according to Kaufmann and Baldes, "Berichte der deutschen chemischen Gesellschaft" [Reports of the German Chemical Society], 70th year, p. 903(1937), by ascertaining the diene number. The unsaturated oils to be preferably employed according to this invention exhibit generally a diene number of more than 5, preferably more than 10. The ricinoleic acid contained in the castor oil can be converted, by splitting off water, into a fatty acid having two conjugated double bonds.

In addition to the two double bonds in conjugated position with respect to each other, still further isolated double bonds can be present in the unsaturated oils preferably employed. Particularly suitable for the coating compositions of this invention proved to be isomerized linseed oil having a diene number of 10–30 and/or tall oil having a diene number of 10–15.

The copolymer II contains, as component (C), 5–15 percent by weight of at least one copolymerizable α,β-olefinically unsaturated carboxylic acid having 3–5 carbon atoms. In addition to itaconic acid, citraconic acid, mesaconic aicd, and maleic acid, the monoesters thereof, or maleic anhydride, preferably suitable are acylic acid and methacrylic acid.

As component (D), the copolymer II contains 3–20, preferably 5–-percent by weight of acrylamide, methacrylamide, methylol acrylamide, methylol methacrylamide, an ether of methylol acrylamide with alcohols having 1–8 carbon atoms, such as, for example, N-butoxymethylmethacrylic acid amide, or an ether of methylol methacrylamide with alcohol having 1–8 carbon atoms.

Optionally, copolymer II can contain, as component (E), up to 20 percent by weight of further copolymerizable, olefinically unsaturated compounds, polymerized into this copolymer. Suitable substances are the conventional copolymerizable vinyl compounds, such as vinyl esters, e.g. vinyl pivalate, vinyl."Versatic" esters (TM of Shell Chemical Co. for a saturated synthetic tertiary monocarboxylic acid, chain length $C_9$–$C_{19}$), and especially vinyl aromatics, such as, e.g., styrene, vinyltoluene, p-chlorostyrene, as well as (meth)acrylonitrile, along with copolymerizable compounds containing several double bonds, such as, for example, butadiene or isoprene.

Preferred copolymers II contain, for example, 50–60 percent by weight of isobutyl acrylate or n-butyl acrylate, and 10–20 percent by weight of methyl methacrylate, or 60–70 percent by weight of n-butyl acrylate as component (A); 7–15 percent by weight of isomerized linseed oil (diene number 20–30) or distilled tall oil "intermediate fraction" or castor oil as component (B); 7–12 percent by weight of acrylic acid as component (C); and 5–15 percent by weight of acrylamide or methacrylamide as component (D), polymerized into these preferred copolymers.

The copolymer II is produced from the individual components generally in accordance with the conventional methods, suitably according to the solution polymerization process, i.e., the polymerization is conducted in solvents wherein the monomers as well as the polymerized products are soluble. Suitable solvents are, for example, alcohols, ethers and/or ketones, or mixtures of these solvents. The boiling point of these suitable solvents or solvent mixtures ranges suitably from approximately 50° to 120° C. For producing the copolymer II, the ordinary, radical-forming polymerization initiators are suitable, such as organic peroxides, e.g. benzoyl peroxide, cyclohexanone peroxide, ditert.-butyl peroxide, organic hydroperoxides, e.g. cumene hydroperoxide, as well as aliphatic azo compounds, such as, for example, azobisisobutyronitrile. These polymerization initiators are suitably employed in amounts of from 0.5 to 5 percent by weight, based on the total monomers. The monomers to be polymerized are generally contained in the above-mentioned solvents or solvent mixtures in a quantity of about 50–75 percent by weight. The solution polymerization is suitably conducted at temperatures in the range of the boiling temperatures of the solutions, in order to be able to remove the heat of reaction by boiling cooling. The monomer solution containing the initiator can be made to polymerize in its entirety; however, it is more advantageous to begin the polymerization at first with only a part of the solution of monomers, or only to provide the solvent and to add the mixture of monomers or the remainder of the solution of monomers gradually, in order to control the heat of reaction occurring during the polymerization more readily. In many cases, it is suitable to conduct the polymerization in the presence of small amounts of conventional regulators. Suitable regulators are, for example, n- or tert.-dodecyl mercaptan, diisopropyl xanthogen disulfide. These regulators are generally employed in amounts of 0.5–3 percent by weight, based on the total monomers.

Copolymer II exhibits, in general, a K value of 12–30, preferably 15–20, measured in accordance with the method of H. Fikentscher (see "Cellulosechemie" [Cellulose Chemistry] 13, 58 [1932]). After the polymerization, the largest portion of the solvent is distilled off. The thus-concentrated, still warm solution of the copolymer II is mixed with such an amount of ammonia or a volatile organic base that, during the later dilution with water, a stable solution or dispersion is produced. For this purpose, it is necessary to neutralize about one-third of the carboxyl groups contained in the copolymer II. Suitable organic bases are, in particular, organic amines volatile at baking temperatures of about 170° C, such as, for example, trialkylamines which are optionally still further substituted, such as, for example, dimethylethanolamine.

The copolymer II, partially present in the form of the ammonium or amine salt thereof, is mixed with the phenolic resin I in customary mixing mechanisms under agitation, proceeding in such a manner that 50–90, preferably 65–80 percent by weight of the copolymer II is combined with 10–50, preferably 20–35 percent by weight of the phenolic resin I (in each case based on the solids content).

In order to prepare the coating compositions of the present invention, the cyclized rubber is first of all dissolved in organic solvents, such as benzene, turpentine, toluene, xylene or trichlorethylene at a preferred concentration of 50–70 percent and an acceptable concentration of 40–80 percent, and the phenolic resin I and the copolymer II are admixed to this solution. Specific examples of this cyclized rubber include hornlike pellets having a specific gravity of about 0.97–1.02, preferably 1.00 measured at 20° C, a melting point of about 135°–150° C as determined by the capillary method of DIN (German Industrial Standard) 53,181 and a viscosity of about 700–1050 seconds running time as measured in a viscosimeter at 50 percent solution of analytical benzene according to DIN 53,211. Thereafter, the reaction is continued with the organic amine until a pH of between 7 and 9 is obtained. This mixture is then dispersed in a high powered mixer with distilled, deionized water. The dispersion produced is diluted with fully desalted water to a solids content of 8 1 16 percent, preferably 11–13 percent; prior to the diluting step, it is possible to admix pigment pastes to the emulsion. It is optionally feasible to admix to the emulsion further conventional additives, such as phenolic resins, maleate alkyd resins, maleate oils, acrylate or methacrylate polymers, defrothers, flow agents, stabilizers, antioxidants.

The coating composition preferably exhibits a conductance of about 1000 myS cm$^{-1}$ (Micro Siemens cm$^{-1}$). For purposes of electrocoating, the article to be coated is connected as the anode and dipped into the coating composition. The deposition generally takes place in steel tanks connected as the cathode. The bath temperature is between 20° and 50° C.

The articles to be coated can consist of metals, preferably pretreated or unpretreated iron or steel sheets, aluminum sheets, or of wooden materials, rubber, synthetic resins, or plastics with conductive surfaces. Preferably articles of rubber, synthetic resins, or plastics are employed, the surfaces of which are provided with a metallic coating by vacuum vapor deposition.

The deposition generally takes place at a voltage of between 50 and 150 volts; after about 2 minutes, a uniform coating has been formed on the article to be coated, having a film thickness of between 20 and 35 microns; this coating, after being rinsed with water, is dried within 30–60 minutes in air at room temperature, being tack-free, or, in an accelerated procedure at temperatures of up to 85° C, and is cured after 20–30 minutes.

Without further elaboration, it is believed that one skilled in the art can, using the preceding description, utilize the present invention to its fullest extent.

The parts and percentages set forth in the Examples are parts by weight and percent by weight.

EXAMPLE 1.

A. Preparation of Phenolic Resin Component I (condensate A)

200 parts of 2,2-bis(p-hydroxyphenyl)propane
132 parts of 40 percent strength formalin, and
19.65 parts of dimethylethanolamine are agitated at 70° C for 2 hours. A yellowish solution is thus obtained exhibiting a solids content of 70 percent.

B. Preparation of a Binder Mixture from a Copolymer and Condensate A

A solution of
322 parts of isbutyl acrylate
53.6 parts of methyl methacrylate
53.6 parts of isomerized linseed oil having a diene number of about 25, determined according to Kaufmann and Baldes
53.6 parts of acrylamide
53.6 parts of acrylic acid
5.36 parts of azobisisobutyronitrile
10.72 parts of di-tert.-butyl peroxide in 134 parts of isopropanol is added to 132 parts of boiling isopropanol within 2 hours, the mixture being continuously refluxed. After another 2 hours, the solids content is examined. If 65 percent solids content has not yet been attaired, 2.68 parts of azobisisobutyronitrile, made into a slurry with 12 parts of isopropanol, is added to the reaction mixture, and the latter is refluxed for another 4 hours. Once a solids content of 65 percent has been obtained, the charge has been polymerized. About 195 parts of solvent is distilled off, toward the end optionally under a slight vacuum. At a final solids content of 85 percent and after cooling to 60°–70° C, 24.4 parts of dimethylethanolamine is stirred into the reaction mixture, and 330 parts of condensate A is admixed thereto. The final solids content is 80 percent.

C. Production of the Coating 214 parts of a 70 percent solution of cyclized rubber having the designation Alpex 450 J of Reichbold-Albert-Chemie AG. in petroleum ether is mixed with 100 parts of solution B, and 50 parts of isodecyl alcohol and 3.5 parts of diisopropanolamine are added thereto. By means of a homogenizer, this solution is diluted with water to a solids content of 12 percent and uniformly dispersed.

On a deep-drawing quality metal sheet of a size of 10×10 cm², connected as the anode, a deposition step is carried out at a deposition voltage of between 50 and 150 volts and 2 minutes depositing time. After rinsing with water, a coating is obtained which is tack free at room temperature after 30–60 minutes and which is thoroughly cured overnight. The thus-deposited film can also be subjected to an accelerated curing process for 20–30 minutes at a temperature of 30° C. The coating is grip-proof (does not feel tacky when handled). In the short term weathering test according to DIN 50018, the film is perfect after six rounds. After 168 hours in the salt-spray testing device according to ASTM B 117-57, there are no signs of corrosion.

EXAMPLE 2.

A. Condensate B

A mixture of 223 parts of 37 percent strength formalin
111 parts of phenol
27.7 parts of 2,2-bis(p-hydroxyphenyl)propane, and
10.3 parts of dimethylethanolamine is agitated under a nitrogen atmosphere at 45° C for about 15 hours. The condensation product is to exhibit a water-diluting capability of at least 3:1 and a content of free formaldehyde of about 8–9 percent (determined according to the hydroxylamine hydrochloride method). The solids content is about 45 percent.

B. Example 1 is repeated, with the only difference that condensate B is employed in place of condensate A. Prior to the dilution with water, the mixture is pigmented with 60 parts of titanium dioxide. A perfectly air-drying film is likewise deposited which, in the salt-spray testing device according to ASTM B 117-57 T, does not yet show any signs of corrosion after 168 hours.

I claim:

1. An aqueous coating composition for the production of electrodepositable coatings followed by air drying or baking at a temperature below 85° C consisting of an aqueous dispersion of a water-insoluble synthetic resin in a mixture dissolved or dispersed in water partly in the form of a salt with ammonia or a water-soluble organic amine, said mixture consisting essentially of:
   I. about 10 to 50 percent by weight of a non-heat reactive phenolic aldehyde resin; and
   II. about 50 to 90 percent by weight of a copolymer of:
      A. about 50 to 85 percent by weight of an ester of acrylic or methacrylic acid with an alcohol having one to 10 carbon atoms;
      B. about 5 to 20 percent by weight of at least one oil containing at least one olefinically unsaturated fatty acid;
      C. about 5 to 15 percent by weight of a copolymerizable $\alpha,\beta$-olefinically unsaturated carboxylic acid having 3 to 5 carbon atoms; and
      D. about 3 to 20 percent by weight of at least one compound selected from the group consisting of acrylamide, methacrylamide, methylolacrylamide and methylolmethacrylamide and ethers of methyllolacrylamide and methylolmethacrylamide with alcohols having 1 to 8 carbon atoms; wherein the sum of the percentages given under A to D being 100 percent, the improvement comprising said water-insoluble synthetic resin being cyclized rubber and dispersed in the aqueous solution or dispersion of said mixture from I and II, the dispersion being made by dispersing a solution of cyclized rubber in organic solvents in the aqueous solution or dispersion of said mixture from I and II, the ratio of weight between cyclized rubber and the sum of I and II being from about 40–70 percent cyclized rubber to about 0–30 percent of the sum of I and II, said cyclized rubber having a specific gravity of about 0.97–1.02, a melting point of about 135°–150° C and a viscosity of about 700–1050 seconds running time as measured in a viscosimeter at 50 percent solution of analytical benzene according to German Industrial Standard 53,211.

2. The compositions of claim 1, further comprising in said copolymer 0.1 to 20 percent by weight of copolymerizable olefinically unsaturated compounds having 1 to 7 carbon atoms.

3. The compositions of claim 1, wherein said cyclized rubber and said components I and II have a solids content of about 8 to 16 percent dispersed in water.

4. A coating material as claimed in claim 1, wherein the copolymer (II) contains:
50–70 percent by weight of (A);
7–15 percent by weight of (B);
5–15 percent by weight of (C); and
5–15 percent by weight of (D);
the sum of the percentages given under (A) to (D) being 100.

* * * * *